US008205809B2

(12) United States Patent
Ray et al.

(10) Patent No.: US 8,205,809 B2
(45) Date of Patent: Jun. 26, 2012

(54) ATOMIZING FOAM PUMP

(75) Inventors: Eugene W. Ray, Barberton, OH (US); Aaron R. Reynolds, North Canton, OH (US)

(73) Assignee: GOJO Industries, Inc., Akron, OH (US)

( * ) Notice: Subject to any disclaimer, the term of this patent is extended or adjusted under 35 U.S.C. 154(b) by 410 days.

(21) Appl. No.: 12/011,826

(22) Filed: Jan. 30, 2008

(65) Prior Publication Data

US 2009/0188994 A1 Jul. 30, 2009

(51) Int. Cl.

| | |
|---|---|
| ***A62C 11/00*** | (2006.01) |
| ***B05B 7/30*** | (2006.01) |
| ***B05B 1/32*** | (2006.01) |
| ***B67D 7/76*** | (2010.01) |
| ***G01F 11/00*** | (2006.01) |

(52) U.S. Cl. ........ 239/343; 239/333; 239/541; 239/575; 222/190; 222/321.7; 222/321.8; 222/341

(58) Field of Classification Search .................. 239/333, 239/343, 541, 575, 590; 222/190, 209, 309, 222/321.1, 321.2, 321.7, 321.8, 321.9, 341, 222/402.1

See application file for complete search history.

(56) References Cited

U.S. PATENT DOCUMENTS

| | | | | |
|---|---|---|---|---|
| 2,515,328 | A | 7/1950 | Bobrick | |
| 3,343,797 | A * | 9/1967 | Bach | 239/355 |
| 5,110,052 | A * | 5/1992 | Graf et al. | 239/333 |
| 6,050,457 | A * | 4/2000 | Arnold et al. | 222/321.9 |
| 7,004,356 | B1 * | 2/2006 | Sayers | 222/137 |
| 7,066,355 | B2 * | 6/2006 | Lewis et al. | 222/145.5 |
| 7,246,723 | B2 * | 7/2007 | Santagiuliana | 222/209 |
| 2001/0042761 | A1 * | 11/2001 | Ophardt et al. | 222/190 |

OTHER PUBLICATIONS

International Search Report from International Application No. PCT/US2009/000541, date of mailing May 5, 2009; 4 pages.

Preliminary Report of Patentability from International Application No. PCT/US2009/000541, issued Aug. 3, 2010; 7 pages.

* cited by examiner

*Primary Examiner* — Len Tran
*Assistant Examiner* — Ryan Reis
(74) *Attorney, Agent, or Firm* — Calfee, Halter & Griswold LLP

(57) ABSTRACT

An antomizing foam pump creates atomized droplets of a foamable liquid in air in a compression chamber. The compression chamber is then collapsed to force the droplets and air through a mesh screen to create a foam product.

20 Claims, 3 Drawing Sheets

ATOMIZING FOAM PUMP

TECHNICAL FIELD

The invention herein resides in the art of foam pumps, wherein a foamable liquid and air are combined to dispense a foam product. More particularly, the invention relates to an atomizing foam pump wherein the foamable liquid is first atomized by an atomizing nozzle and then forced through at least one screen to produce a uniform high quality foam product.

BACKGROUND OF THE INVENTION

For many years, it has been known to dispense liquids, such as soaps, sanitizers, cleansers, disinfectants, and the like from a dispenser housing maintaining a refill unit that holds the liquid and provides the pump mechanisms for dispensing the liquid. The pump mechanism employed with such dispensers has typically been a liquid pump, simply emitting a predetermined quantity of the liquid upon movement of an actuator. Recently, for purposes of effectiveness and economy, it has become desirable to dispense the liquids in the form of foam, generated by the interjection of air into the liquid. Accordingly, the standard liquid pump has given way to a foam generating pump, which necessarily requires means for combining the air and liquid in such a manner as to generate the desired foam.

Typically foam dispensers generate foam by pumping a foamable liquid stream and an air stream to a mixing area and forcing the mixture through a screen to better disperse the air as bubbles within the foamable liquid and create a more uniform foam product. The more minute and numerous the air bubbles the thicker and softer the foam, although too much air can cause the foam to be too dry feeling. The key to a desirable foam product is violent mixing of the foamable liquid and air to disperse the air bubbles within the liquid. The foam forming capabilities of screens alone is limited, and there is therefore a need for alternative methods of mixing the foamable liquids with air.

SUMMARY OF THE INVENTION

The present invention relates to an atomizing foam pump. The foam pump has an atomizing pump assembly in fluid communication with a container holding a foamable liquid. The pump assembly includes a mounting portion for mounting the pump to the container, an inlet portion fluidly communicating with the foamable liquid, a liquid chamber slidably positioned within the inlet portion, a first spring positioned within the inlet portion that acts to bias the pump assembly to an uncompressed position, a valve in said inlet portion preventing fluid flow back into the container, and an atomizing nozzle. The foam pump also includes a compression chamber in fluid communication with the liquid chamber and separated from the liquid chamber by the atomizing nozzle. The foam pump further includes a nozzle assembly that partially defines the compression chamber and is slidably positioned within the compression chamber. The nozzle assembly includes a wiper seal in contact with an inner wall of the compression chamber, an outlet nozzle, a screen positioned in the nozzle, and a second spring acting to bias the nozzle assembly in an uncompressed position. The first spring of the foam pump has a spring constant value less than the second spring so that a compression force acting on the nozzle assembly will cause substantial compression of the first spring before causing compression of the second spring. This sequence of compression results in a foam pump that first atomizes a foamable liquid and then compresses the atomized liquid and the air in which it is dispersed through a screen, providing a more uniform and high quality foam.

DETAILED DESCRIPTION OF THE INVENTION

Figure 1:
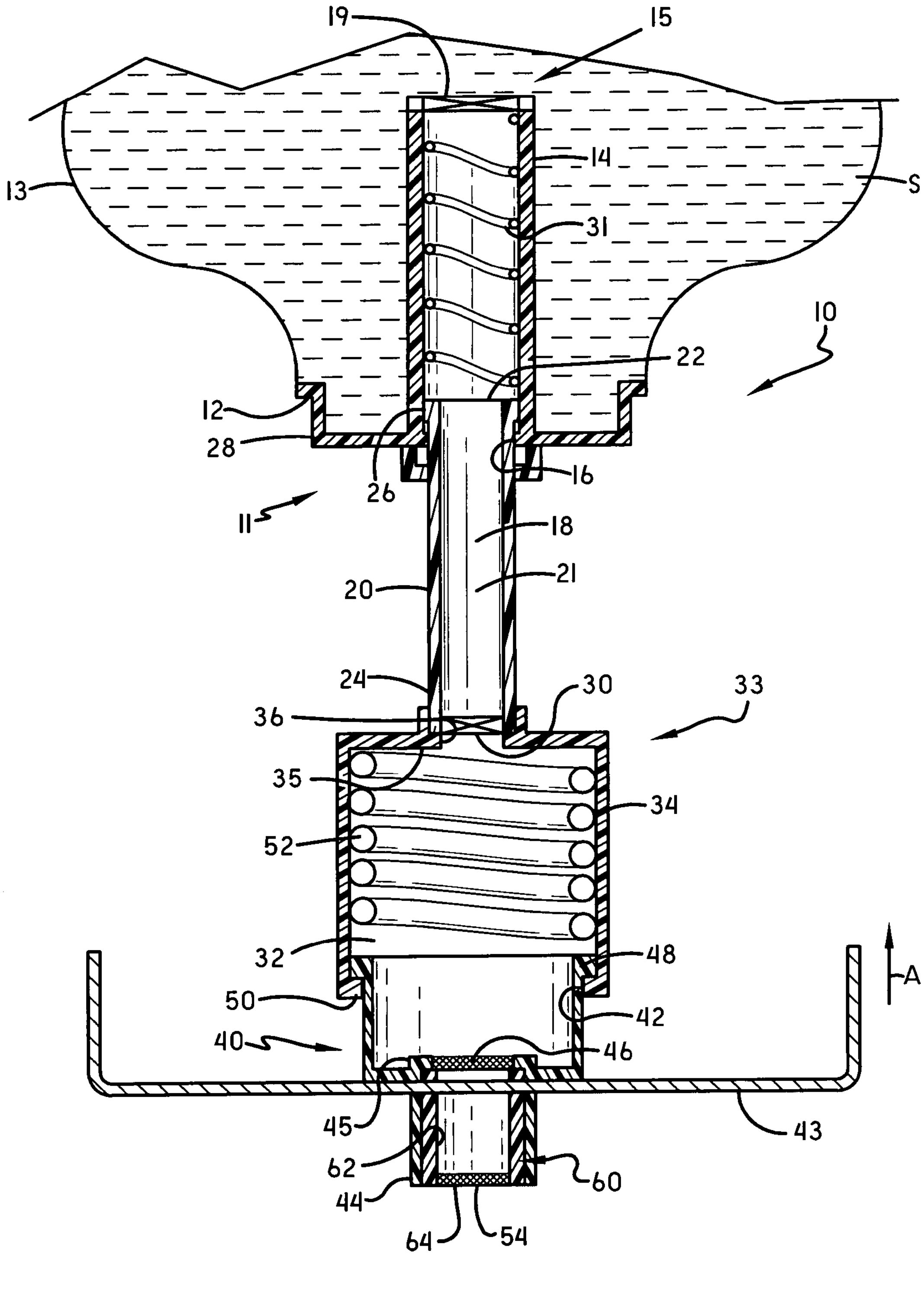
FIG. 1 is a section view of the atomizing foam pump of the present invention in a completely uncompressed state.
Figure 2:
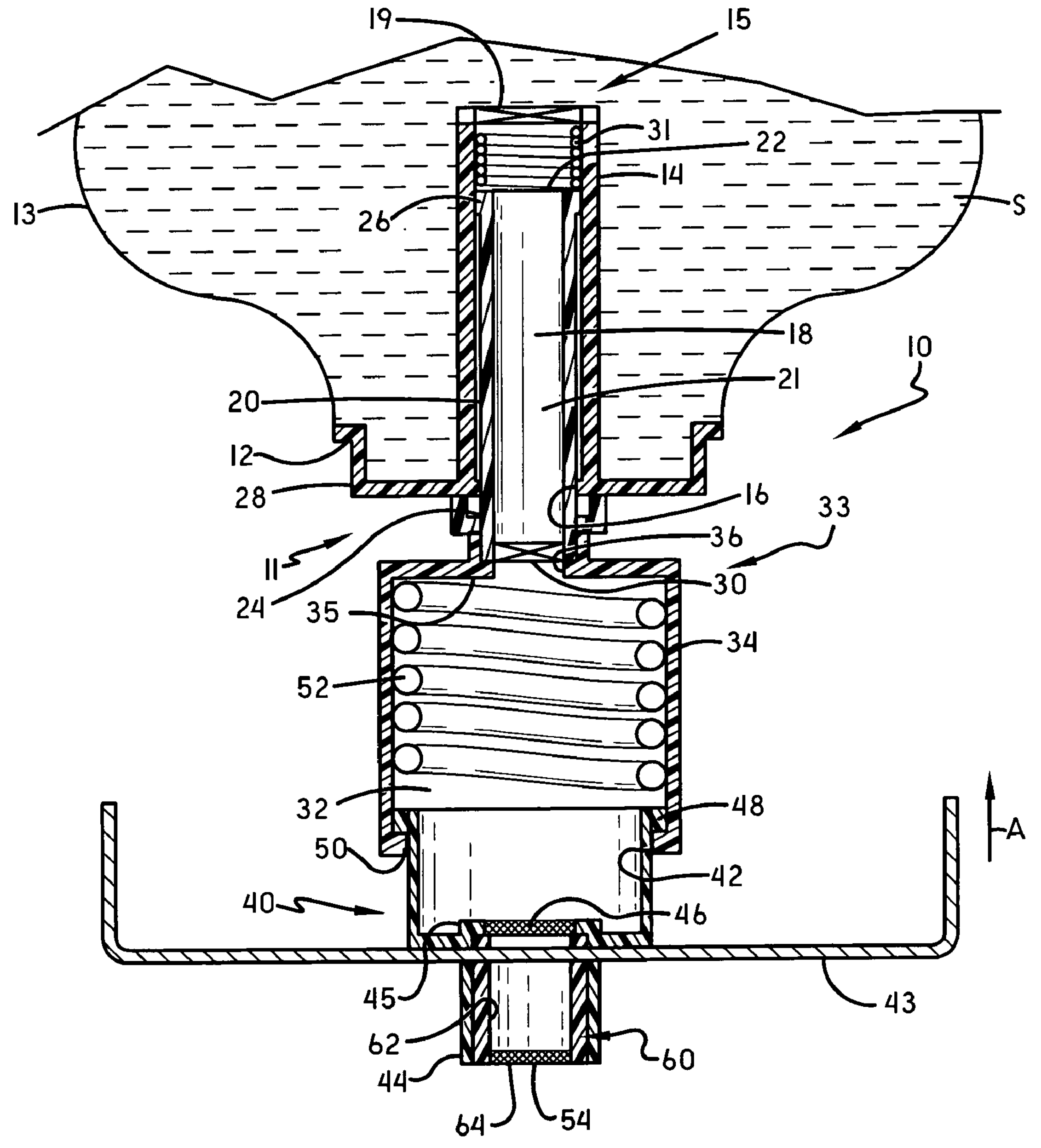
FIG. 2 is a section view of the atomizing foam pump of the present invention in a partially compressed state.
Figure 3:
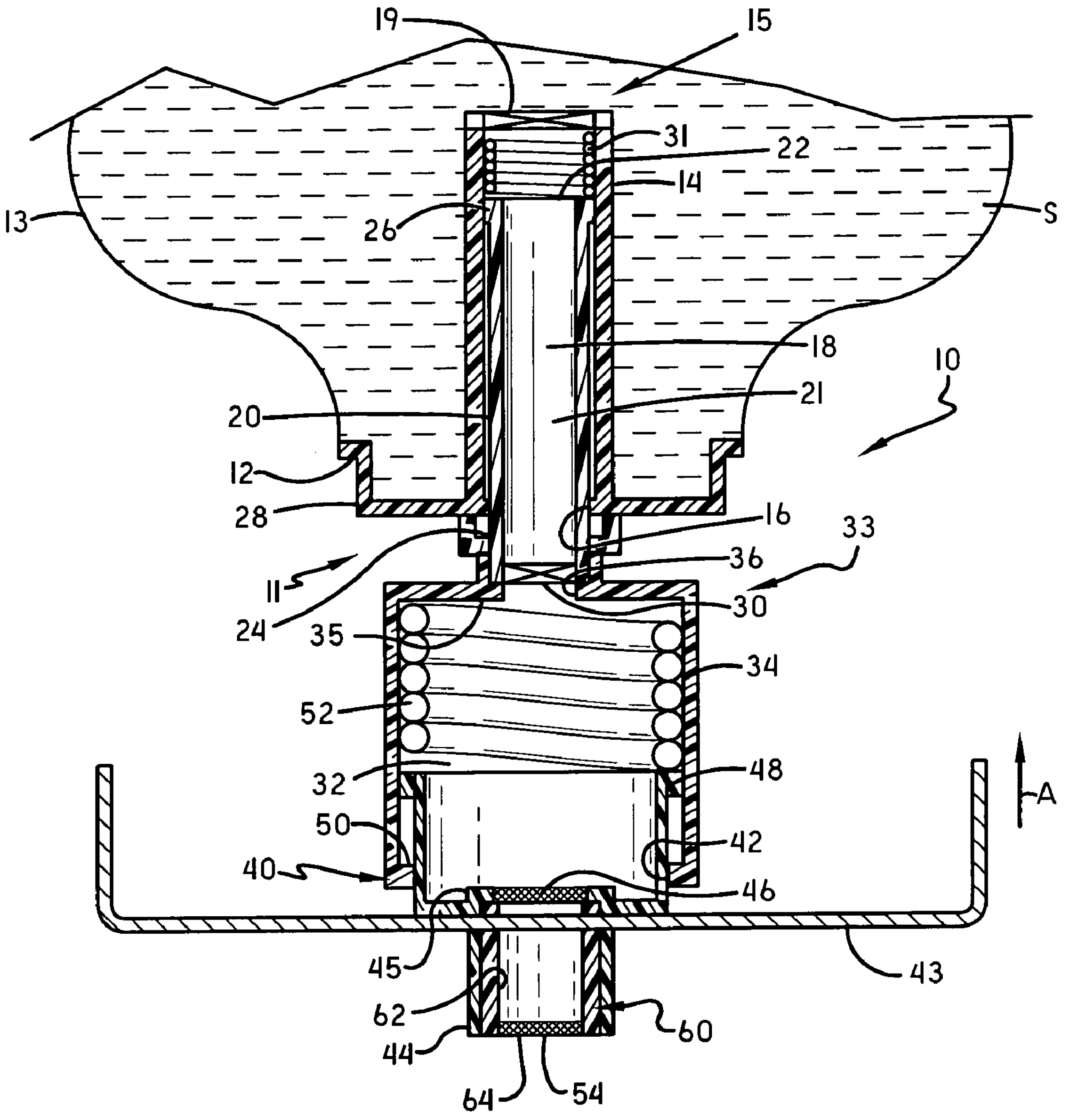
FIG. 3 is a section view of the atomizing foam pump of the present invention in a fully compressed state.

The atomizing foam pump of the present invention is shown in FIGS. 1-3 and is generally indicated by the number 10. Prior art foam pumps commonly premix a foamable liquid and air in a single chamber and force the mixture through a screen to generate a more uniform foam product. Atomizing foam pump 10 first sprays the foamable liquid into an air filled chamber to create a premix of atomized liquid droplets in air, and then collapses the chamber to pass the mixture through a screen. It is believed that by forcing the mixture of atomized liquid droplets in air through the screen, the quality of the resulting foam product is improved as compared to forcing a more coarse mixture of liquid and air through the screen.

Atomizing foam pump 10 includes an atomizing pump assembly 11 that draws a foamable liquid from a container and atomizes the liquid to facilitate foam forming. Atomizing pump assembly 11 includes a mounting portion 12 that acts to secure atomizing foam pump 10 to a container 13 filled with foamable liquid S. Mounting portion 12, as depicted in FIGS. 1-3 is an internally threaded cap adapted to mate with external threads on the neck of container 13, as is known in the art, although other methods of attachment may be employed. Mounting portion 12 also includes an inlet portion 14 that is in fluid communication with the foamable liquid S in container 13. Inlet portion 14, as shown, is a cylindrical tube mounted coaxially around a bore 16 in mounting portion 12 and extending into liquid S in container 13.

Atomizing pump assembly 11 also includes an liquid chamber 18 defined in part by inlet portion 14 and an atomizing piston 20 having a passage 21 with a first end 22 positioned within and in fluid communication with inlet portion 14. A one way valve 19 serves as one end of liquid chamber 18 and is positioned at an opening 15 opposite bore 16 in inlet portion 14. Valve 19 permits foamable liquid S to be drawn from container 13 into the interior of liquid chamber 18, but prevents it from flowing in the opposite direction back into container 13. The foamable liquid S is caused to flow by movement of atomizing piston 20.

Atomizing piston 20 is slidably positioned within bore 16 so that it can slide within bore 16 and inlet portion 14. Atomizing piston 20 has a flange 26 at first end 22 that prevents it from being removed from inlet portion 14. Second end 24 of passage 21 within atomizing piston 20 is capped with an atomizing nozzle 30, which serves as the other end of liquid chamber 18 and controls the flow of foamable liquid out of liquid chamber 18. Atomizing nozzle 30 may be any valve having an orifice small enough to cause atomization of a foamable liquid as it is forced therethrough. The term atomization, as used herein, refers to the conversion of the foamable liquid to a fine mist or spray of small droplets, and appropriate atomizing nozzles are generally known in the art. An atomized spray is generated by forcing liquid through a narrow outlet hole. The liquid is sped up by the narrow passage, and then shears when it hits the air at the outlet of the hole.

A first spring 31 is positioned within inlet portion 14 between valve 19 and flange 26 of atomizing piston 20 to bias atomizing pump assembly 11 to an uncompressed or rest position, as shown in FIG. 1. The sliding motion of atomizing piston 20 within bore 16 and inlet portion 14 changes the volume of liquid chamber 18, alternatively creating pressure to force liquid S out through atomizing nozzle 30, or creating a vacuum to draw liquid S from container 13.

Atomizing foam pump 10 further includes a compression chamber assembly 33 having a compression chamber 32 defined by a compression chamber housing 34 and its receipt of a nozzle assembly 40. Compression chamber housing 34 is attached to second end 24 of atomizing piston 20 at an inlet wall 35 and has a first opening 36 in inlet wall 35 to allow fluid communication between liquid chamber 18 and compression chamber 32 through atomizing nozzle 30. Compression chamber housing 34 may be attached to second end 24 by any conventional method known to those skilled in the art for forming a sealed connection, including by press fitting, adhesives, threads, snap fit and the like. A nozzle assembly 40 is positioned slidably within a second opening 42 of compression housing 34, and is biased to a rest position by a second spring 52. An outlet nozzle 44 extends from an outlet wall 45 of nozzle assembly 40 and has a foam creating screen 46 disposed therein. A wiper seal 48 is attached to a portion of nozzle assembly 40 located within compression chamber 32 and contacts the inner wall of compression housing 34, thereby creating a fully sealed compression chamber 32 defined by compression housing 34 and extending between inlet wall 35 and outlet wall 45. Wiper seal 48 maintains nozzle assembly 40 within second opening 42 by engaging a lip 50 of second opening 42. Second spring 52 biases nozzle assembly 40 to an uncompressed position, as shown in FIGS. 1 and 2.

Nozzle assembly 40 includes a pushbar 43 for applying a compression force to atomizing foam pump 10. The compression force may be applied to pushbar 43 by any known method. Compression force is applied to pushbar 43 in the direction of arrow A to force foamable liquid out of liquid chamber 18 and into compression chamber 32 as atomized droplets, and to collapse compression chamber 32 to force those atomized droplets through screen 46, along with the air in which these droplets are dispersed. This is discussed in more detail below.

First spring 31 has a spring constant value less than that of second spring 52 so that a compression force acting on pushbar 43 will cause actuation of atomizing pump assembly 11 before causing compression of nozzle assembly 40. FIG. 1 shows atomizing foam pump 10 in a completely uncompressed or rest state. First spring 31 and second spring 52 cause atomizing pump assembly 11 and nozzle assembly 40, respectively, to remain in this rest state unless a compression force is applied at pushbar 43. FIG. 2 shows atomizing foam pump 10 in a partially compressed state in which only atomizing pump assembly 11 is actuated and first spring 31 is compressed due to the lower spring constant value of first spring 31. This initial actuation of atomizing pump assembly 11 by a compression force acting on pushbar 43 causes the volume of the liquid chamber to decrease as atomizing piston 20 is forced into inlet portion 14 toward valve 19. As a result, some of the foamable liquid within that volume is forced through atomizing nozzle 30, thereby dispersing an atomized foamable liquid in the air within compression chamber 32. In the embodiment of FIGS. 1-3, compression chamber 32 has a larger internal volume than that of liquid chamber 18 in order to accommodate the increased volume of the atomized foamable liquid and to minimize the amount of the atomized foamable liquid from coalescing back to its original state.

FIG. 3 depicts atomizing foam pump 10 in a completely compressed state in which additional compression force from that applied to reach the partial compression of FIG. 2 results in compression of second spring 52, and movement of nozzle assembly 40 towards inlet wall 35. Movement of nozzle assembly 40 causes the volume of compression chamber 32 to decrease, thus forcing the atomized foamable liquid and air located therein through screen 46 and outlet nozzle 44 thereby creating a foam product dispensed at outlet 54. In an alternative embodiment, a mixing cartridge 60 can be placed in outlet nozzle 44, and such a mixing cartridge 60 would be a hollow tube 62 providing screen 46 at one end proximate compression chamber 32 and providing screen 64 at the other end proximate outlet 54. It should be appreciated that minor compression of second spring 52 may result before complete compression of first spring 31, and that the difference between the spring constant values of first spring 31 and second spring 52 will determine the amount of premature compression of second spring 52. Therefore, it is preferable to employ springs having as great a difference in spring constant values as is possible to ensure proper sequence of compression, and to improve the quality of the foamed liquid.

Release of the compression force acting on pushbar 43 causes first spring 31 and second spring 52 to decompress, or return to a rest state, in the opposite order of compression. As a result of the decompression, foamable liquid is drawn into liquid chamber 18 through valve 19 and air is drawn through outlet nozzle 44 and into compression chamber 32, thereby readying atomizing foam pump 10 to produce the foam product upon application of subsequent compression force. The decompression of atomizing foam pump 10 also sucks back any foam remaining in outlet nozzle 44 to prevent dripping.

In one embodiment of the invention, compression chamber 32 may further include a sponge disposed therein in order to absorb the atomized foamable liquid. The sponge may be made of any open cell foam material such as an ester based polyurethane material. The atomized liquid would coalesce and breakup multiple times as a result of the sponge before being forced out through screen 46.

The invention claimed is:

1. A foam pump comprising:

(a) an atomizing pump assembly in fluid communication with a container holding a foamable liquid, said pump assembly including:

an inlet portion fluidly communicating with the foamable liquid through an inlet valve, said inlet valve preventing the liquid from flowing back into the container, an atomizing piston slidably positioned within said inlet portion and having an open end received in said inlet portion and an opposite end external of said inlet portion, a one-way atomizing nozzle at said opposite end of said atomizing piston, said inlet portion and said atomizing piston defining a sealed liquid chamber between said inlet valve and said atomizing nozzle, wherein said atomizing nozzle creates a mist of the foamable liquid as the foamable liquid passes from said liquid chamber; and a first spring positioned within said inlet portion acting to bias said atomizing pump assembly to an uncompressed position, and (b) a compression chamber assembly including a compression chamber housing in fluid communication with said liquid chamber and separated from said liquid chamber by said atomizing nozzle, said atomizing nozzle prohibiting air in said compression chamber assembly from entering said liquid chamber, said compression chamber housing having an opening opposite said atomizing nozzle and a nozzle assembly slidably positioned within said opening, said nozzle assembly and said compression chamber housing defining a compression chamber and said nozzle assembly including:

a wiper seal in contact with an inner wall of said compression chamber, an outlet nozzle, a screen positioned in said nozzle, and a second spring acting to bias said compression chamber assembly in an uncompressed position, wherein, said first spring has a spring constant value less than said second spring.

2. The foam pump according to claim 1, further comprising a sponge disposed within said compression chamber.

3. A foam pump comprising:

(a) a collapsible compression chamber in which a liquid mist and air are mixed and used to form a foam, the collapsible compression chamber including a first housing portion and a second housing portion, wherein the collapsible compression chamber has a first volume when the first housing is in a first position with respect to the second housing and a second volume when the first housing is in a second position with respect to the second housing; the collapsible compression chamber having a first end and a second end;

(b) a one-way atomizing nozzle positioned adjacent to the first end of the collapsible compression chamber and prohibiting air from escaping the collapsible compression chamber through the atomizing nozzle when the collapsible compression chamber is collapsed, the atomizing nozzle having an orifice that is capable of restricting flow into the collapsible compression chamber and applying a shearing force to liquid passing therethrough to create the liquid mist; and (c) a nozzle assembly positioned adjacent to the second end of the collapsible compression chamber, the nozzle assembly being configured to dispense the foam formed from the liquid mist created by the atomizing nozzle and the air in the collapsible compression chamber.

4. The foam pump of claim 3, wherein the nozzle assembly forms part of the collapsible compression chamber and is slidably positioned within the second end such as to increase and decrease the volume of the collapsible compression chamber.

5. The foam pump of claim 3, further comprising a liquid chamber in fluid communication with the collapsible compression chamber, the atomizing nozzle being positioned between the liquid chamber and the collapsible compression chamber to seal the liquid chamber.

6. The foam pump of claim 5, wherein the liquid chamber is collapsible.

7. The foam pump of claim 5, wherein the liquid chamber is in fluid communication with a fluid reservoir.

8. The foam pump of claim 6, wherein the collapsible liquid chamber is biased in an un-collapsed position by a first spring, and the collapsible compression chamber is biased in an un-collapsed position by a second spring.

9. A foam pump comprising:

a collapsible compression chamber in which a liquid mist and air are mixed and used to form a foam, the collapsible compression chamber having a first end and a second end;

a one-way atomizing nozzle positioned adjacent to the first end of the collapsible compression chamber and prohibiting air from escaping the collapsible compression chamber through the atomizing nozzle, the atomizing nozzle having an orifice that is capable of restricting flow into the collapsible compression chamber and applying a shearing force to liquid passing therethrough to create the liquid mist;

a nozzle assembly positioned adjacent to the second end of the collapsible compression chamber, the nozzle assembly being configured to dispense the foam formed from the liquid mist created by the atomizing nozzle and the air in the collapsible compression chamber;

a liquid chamber in fluid communication with the collapsible compression chamber, the atomizing nozzle being positioned between the liquid chamber and the collapsible compression chamber to seal the liquid chamber;

wherein the liquid chamber is collapsible;

wherein the collapsible liquid chamber is biased in an un-collapsed position by a first spring, and the collapsible compression chamber is biased in an un-collapsed position by a second spring; and wherein the first spring has a spring constant that is less than a spring constant of the second spring.

10. The foam pump of claim 5, wherein the liquid chamber is defined by a tube and an atomizing piston slidably positioned within the tube, the atomizing piston having a passage therethrough that is in fluid communication with the atomizing nozzle.

11. The foam pump of claim 3, wherein the nozzle assembly includes at least one screen therein.

12. The foam pump of claim 3, wherein the nozzle assembly includes a sponge disposed therein.

13. A method of generating foam from a liquid comprising the steps of:

mixing the liquid with air by forcing the liquid from a sealed liquid chamber through an atomizing nozzle having a reduced diameter to create a mist in an adjacent air filled collapsible compression chamber; and collapsing the compression chamber that includes a first housing portion and a second housing portion by moving the first housing with respect to the second housing to cause the mixture to be expelled through a nozzle wherein the atomizing nozzle prevents liquid or air from passing back through the atomizing nozzle when the collapsible compression chamber is collapsed.

14. The method of claim 13, wherein the step of forcing the liquid through an atomizing nozzle includes collapsing the liquid chamber that is in fluid communication with the atomizing nozzle.

15. The method of claim 13, wherein the step of collapsing the compression chamber includes moving an actuation mechanism.

16. The method of claim 13, wherein the mist and air mixture is forced through a mesh screen before being expelled from said nozzle.

17. The foam pump of claim 1, wherein the movement of the atomizing piston within the inlet portion reduces the volume of the liquid chamber to force the foamable liquid through the atomizing nozzle.

18. The foam pump of claim 3 further comprising a liquid chamber, wherein the liquid chamber is configured to force pressurized liquid through the orifice of the atomizing nozzle to create the mist.

19. The method of claim 13, wherein the atomizing nozzle is configured to prohibit the air in the compression chamber from entering the liquid chamber.

20. A foam pump for a liquid container, comprising:

a first chamber movable between a compressed position and an uncompressed position, the first chamber having an inlet valve and an atomizing nozzle, the inlet valve and the atomizing nozzle configured to seal the first chamber when the first chamber is non-moving; and a second chamber in fluid communication with the first chamber, second chamber including a first housing portion and a second housing portion, wherein the second chamber has a first volume when the first housing is in a first position with respect to the second housing and a second volume when the first housing is in a second position with respect to the second housing; the second chamber configured to dispense a foam, and wherein the atomizing nozzle prohibits air in the second chamber from entering the first chamber when the second chamber is compressed;

wherein:

the movement of the first chamber from the compressed position to the uncompressed position draws liquid from the liquid container, through the inlet valve, and into the first chamber;

the movement of the first chamber from the uncompressed position to the compressed position forces the liquid within the first chamber through the atomizing nozzle and into the second chamber; and the passage of the liquid through the atomizing nozzle forms a mist of liquid in the second chamber, the mist of liquid mixing with air in the second chamber, the mixture of the mist of liquid and air used to form the foam dispensed by the second chamber when the second chamber is compressed.

* * * * *